Aug. 16, 1932.  L. REITER  1,872,187

FASTENER

Filed Jan. 2, 1929

INVENTOR
Lues Reiter
BY
Harry Jacobs
ATTORNEY

Patented Aug. 16, 1932

1,872,187

UNITED STATES PATENT OFFICE

LUES REITER, OF PROVIDENCE, RHODE ISLAND

FASTENER

Application filed January 2, 1929. Serial No. 329,713.

This invention relates to fasteners and particularly to those of the snap type wherein one element of the fastener is permanently secured to one article, and the other element of the fastener to another article, whereby the articles may be removably secured together through the detachable engagement of the fastener elements.

Figure 1:
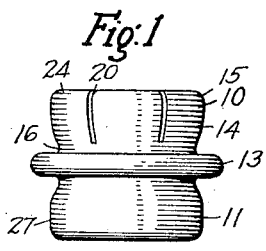
Figure 2:
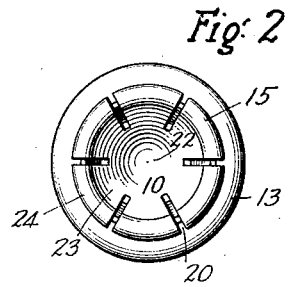
Figure 3:
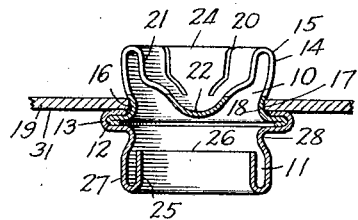
Figure 4:
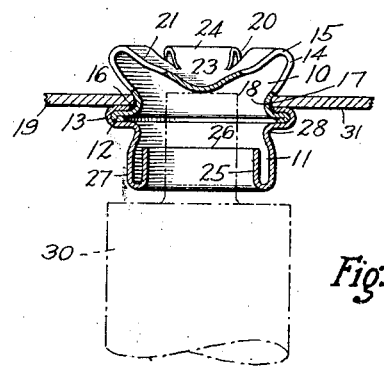

My invention contemplates the provision of a fastener element usable either as a stud member or as a socket member and which may be secured in place permanently or detachably, as desired, with a minimum of labor. Snap fastener elements are frequently used in connection with the curtains of automobiles and similar devices, and should be capable of being quickly and easily secured in place and should further be adapted to be permanently secured in place, if desired, against possibility of accidental removal from the articles to which they are attached, and against possibility of rattling or looseness in said articles. My invention is designed to meet these conditions, the various objects of my invention being apparent from the description which follows and from the drawing, in which, Fig. 1 is a front elevation of my improved fastener element, Fig. 2 is a top plan view of the same, Fig. 3 is a vertical section of the same as it appears after having been removably inserted into place through an aperture in the article to which it is to be secured, and Fig. 4 is a similar view of the same, showing the element spread and permanently and tightly secured in place, and showing further in dotted lines, a tool designed to perform the spreading operation.

In that practical embodiment of my invention which I have illustrated by way of example, I prefer to make my improved fastener element of two pieces of material, namely, of a hollow, slotted member 10, which I will refer to hereinafter as the clinching member, and a hollow engaging member 11. The clinching member 10 terminates in a projecting flange as 12 (Fig. 3) and the member 11 terminates in a projecting shoulder or rim 13 bent over the flange 12 and thereby firmly securing the members together against possible displacement. The outer wall 14 of the member 10 is preferably of its greatest diameter near the top 15 thereof, being curved slightly inwardly toward the bottom and where it meets the innermost part of the flange 12, being shaped to form a groove 16 of sufficient height to receive the edge 17 of the aperture 18 formed in the member 19, such as the thin sheet to which the element is to be attached.

In order to form the inner wall 21 of the member 10, spaced inwardly from the outer wall 14, the central portion of said member is depressed as at 22 to form a re-entrant portion 23 in the clinching member, extending considerably below the upper edge 15 thereof.

The clinching member 10 is further provided with a series of preferably radial slots 20 spaced from each other and thereby providing the resilient sections 24 between the slots, which sections are adapted to yield somewhat under pressure. It will be understood that the diameter of the resilient or yieldable sections 24 is slightly greater than that of the aperture 18. Consequently, the sections do not readily pass through said aperture, but are designed to pass therethrough on the application of some pressure, whereby the yieldable sections 24 may yield inwardly. After passing through the aperture, the sections 24 are released and move radially outwardly a sufficient amount to hold the member 10 in place, the edge 17 of the aperture being held in the groove 16.

The engaging member 11 terminates in an inner wall 25, open at the end thereof as at 26, and spaced from the outer wall 27. Said inner wall is formed by bending back the end of the member 11 inside of the outer wall 27 thereof. Said outer wall 27 of the engaging member 11 is preferably provided with a groove 28 at the juncture thereof with the shoulder for the reception of the yieldable member of a socket element of any well known type, the member 11 preferably serving as a stud element of a snap fastener.

It will be understood, however, that the member 11 may be used as a socket element, if desired, sufficient space being left below the end 26 of the wall 25 to receive a suitable stud.

When it is desired to secure my improved fastener element permanently in place, as for instance, to the sheet 19, which may be part of the body or of the wind-shield of an automobile, the reentrant portion 23 of the clinching member 10 may be pushed out toward the top edge 15 of said member after the element has been pushed through the aperture 18. This may be done by means of a suitably shaped tool as 30, shown in dotted lines in Fig. 4. The shoulder or rim 13 engages the face 31 of the sheet 19 and holds the element against displacement during the clinching operation, and also serves as a stop to limit the inserting movement of the element through the aperture 18. The tool 30 is pressed against the depressed portion 22 and moved axially of the element whereby the member 10 is somewhat distorted, the member bending about the edge 17 of the aperture 18 and the yieldable sections 24 being sufficiently increased in diameter to bind tightly against the edge 17. All possibility of looseness or rattling of the element in the aperture 18 is thereby prevented.

It will be understood that while I have shown and described a preferred embodiment of my invention, I do not wish or intend to limit myself thereto, but intend to claim my invention as broadly as may be permitted by the state of the prior art and the scope of the appended claim.

I claim:

In a fastener installation, a support, a rigid wall surrounding an aperture in the support, a two-piece fastener element comprising a yieldable clinching member having an outer wall and a depressed inner wall closed at the bottom and spaced from the outer wall and continuous therewith, said member being provided with spaced radial slots passing through the upper part of both of said walls, and forming yieldable sections between said slots, an annular flange at the edge of said outer wall, the juncture of said flange and the outer wall being shaped to provide a groove, the least diameter of said groove being less than any outer diameter of said outer wall, an engaging member having an outer wall and a depressed apertured inner wall spaced from the outer wall, and a terminal shoulder on said engaging member bent about the flange of the clinching member and holding said clinching member in place, the clinching member being adapted to be forced through the aperture in the support whereby the wall of the aperture first forces the yieldable sections inwardly and finally rests in the groove of the clinching member and against the shoulder, the diameter of the shoulder being greater than that of the engaging member for that purpose, said yieldable sections expanding after passage through said opening and resisting the withdrawal of said clinching member back through said opening, and said depressed and slotted inner wall of the clinching member being movable outwardly by a tool inserted through the aperture of the engaging member into direct engagement with said last-mentioned wall to increase the diameter of the yieldable sections permanently and thereby to deepen said groove.

LUES REITER.